US012049085B2

(12) United States Patent
Shinano

(10) Patent No.: US 12,049,085 B2
(45) Date of Patent: Jul. 30, 2024

(54) CLEANING DEVICE FOR LIQUID JET HEAD

(71) Applicant: SII Printek Inc., Chiba (JP)

(72) Inventor: Yosuke Shinano, Chiba (JP)

(73) Assignee: SII PRINTEK INC., Chiba (JP)

( * ) Notice: Subject to any disclaimer, the term of this patent is extended or adjusted under 35 U.S.C. 154(b) by 113 days.

(21) Appl. No.: 17/873,348

(22) Filed: Jul. 26, 2022

(65) Prior Publication Data

US 2023/0029548 A1 Feb. 2, 2023

(30) Foreign Application Priority Data

Jul. 28, 2021 (JP) ................................ 2021-123287

(51) Int. Cl.
*B41J 2/165* (2006.01)

(52) U.S. Cl.
CPC ................................ *B41J 2/16552* (2013.01)

(58) Field of Classification Search
CPC ................ B41J 2/16552; B41J 2/16523; B41J 2/16535; B41J 2/16532; B41J 2/16585; B41J 2/16538
See application file for complete search history.

(56) References Cited

U.S. PATENT DOCUMENTS

2011/0205296 A1 8/2011 Colombat et al.
2017/0297339 A1* 10/2017 Midorikawa ........ B41J 2/16547

FOREIGN PATENT DOCUMENTS

FR 2937584 A1 * 4/2010 .......... B41J 2/16544
JP 2012-506787 A 3/2012

* cited by examiner

*Primary Examiner* — Sharon Polk
(74) *Attorney, Agent, or Firm* — Crowell & Moring LLP

(57) ABSTRACT

There is provided a cleaning device for a liquid jet head which can efficiently clean a jet plate attached with a guard member while preventing cleaning liquid from being leaked along an opening of the guard member. The cleaning device for the inkjet head includes a holder moving relatively to the inkjet head, wherein the holder includes a jet section for jetting the cleaning liquid toward a nozzle guard of the inkjet head, a wipe part which has a width in a width direction perpendicular to a moving direction of the holder smaller than a width of an opening of the nozzle guard, and which wipes a nozzle plate due to a movement of the holder, a first suction section disposed ahead of the jet section and the wipe part in the moving direction of the holder, and a second suction section disposed posterior to the jet section and the wipe part in the moving direction of the holder.

12 Claims, 11 Drawing Sheets

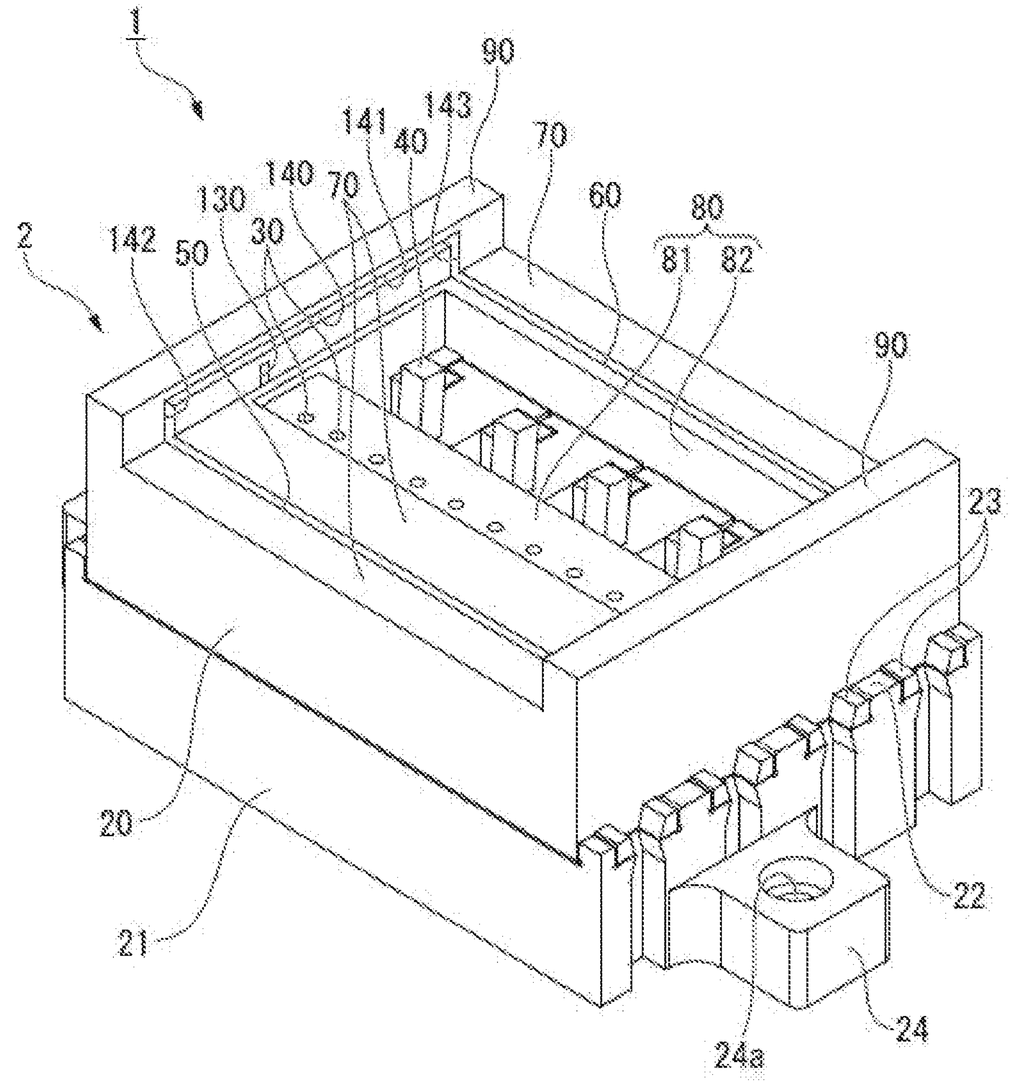
FIG. 10

CLEANING DEVICE FOR LIQUID JET HEAD

RELATED APPLICATIONS

This application claims priority to Japanese Patent Application No. 2021-123287, filed on Jul. 28, 2021, the entire content of which is incorporated herein by reference.

BACKGROUND OF THE INVENTION

1. Field of the Invention

The present disclosure relates to a cleaning device for a liquid jet head.

2. Description of the Related Art

In JP-T-2012-506787 (the term "JP-T" as used herein means a published Japanese translation of a PCT patent application), there is disclosed a continuous jet printer which has a print head, and a cleaning device for cleaning the print head after terminating ejection of a print liquid. The print head has a nozzle plate provided with at least one nozzle for ejecting the print liquid. The cleaning device has a scraper, a unit for moving the scraper so as to scrape against the nozzle plate, a unit for supplying the nozzle plate with a cleaning liquid, and a unit for sucking the cleaning liquid to be wiped off by the scraper in front of the scraper.

Incidentally, such a printer as described above generates a variety of images from a simple character string up to a copy of a photograph on base materials having a variety of characteristics in a variety of industrial fields. Such a printer includes a single liquid jet head or a plurality of liquid jet heads.

When the liquid jet head is contaminated, the quality of the image to be generated generally tends to degrade. Therefore, it has been a challenge to ensure the cleanness in aging of the jet plate through which the liquid is ejected, and a variety of functional components of the liquid jet head interacting with the liquid or a surrounding medium.

As one of the countermeasures against the above, the liquid jet head is subject to periodic care or periodic cleaning. In particular, the jet plate incurs degradation in print quality in some cases due to a deformation or a breakage caused by a contact and so on with the base material and so on as a print target besides an influence of the contamination. Therefore, there exists a liquid jet head having a guard member for protecting the jet plate. Such a liquid jet head having the guard member prevents the contact with the base material and so on, and at the same time, causes a decrease in cleaning efficiency of a wipe part such as the scraper used for the cleaning on the other hand. Therefore, a cleaning device suitable for the liquid jet head is necessary.

For example, in the cleaning device in the related art described above, when the guard member having an elongated opening for exposing the nozzles is mounted on the jet plate, in order for the wipe part to directly wipe the jet plate, it is necessary to change a shape of the wipe part to a shape which can be inserted in the elongated opening of the guard member. Further, it is necessary for a width of the wipe part on this occasion to be smaller than the opening width of the guard member. In this case, there is a possibility that some of a cleaning liquid supplied to the jet plate leaks to an area around the wipe part along an inside of the opening of the guard member to contaminate a peripheral part of the liquid jet head.

The present disclosure has been made in view of the problems described above, and has an object of providing a cleaning device for the liquid jet head which can efficiently clean the jet plate on which the guard member is mounted while preventing the cleaning liquid from being leaked along the opening of the guard member.

SUMMARY OF THE INVENTION (1) cleaning device for a liquid jet head according to an aspect of the present disclosure includes a holder moving relatively to the liquid jet head including a jet plate provided with a jet hole configured to jet liquid, and a guard member which covers the jet plate, and is provided with an opening configured to expose the jet hole, wherein the holder includes a jet section configured to jet cleaning liquid toward the guard member, a wipe part which has a width in a width direction perpendicular to a moving direction of the holder smaller than a width of the opening of the guard member, and which wipes the jet plate due to a movement of the holder, a first suction section disposed ahead of the jet section and the wipe part in the moving direction of the holder, and a second suction section disposed posterior to the jet section and the wipe part in the moving direction of the holder.

According to the cleaning device for the liquid jet head related to the present aspect, since the wipe part provided to the holder is smaller than the width of the opening of the guard member in the width direction perpendicular to the moving direction of the holder, it is possible to wipe the jet plate by moving the holder in the state in which the wipe part is inserted in the opening of the guard member. Further, the holder is provided with the jet section for jetting the cleaning liquid, and it is possible for the wipe part to wipe the jet plate in the state of being wetted with the cleaning liquid, and therefore, the cleaning performance by the wipe part is enhanced. Here, some of the cleaning liquid is urged to be leaked forward and backward in the moving direction of the holder along the opening of the guard member, but the holder is provided with the first suction section and the second suction section across the jet section and the wipe part, and therefore, it is possible to suction and thus capture the cleaning liquid which is urged to be leaked forward and backward in the moving direction of the holder to thereby prevent the cleaning liquid from being leaked from the holder.

(2) In the cleaning device for the liquid jet head according to the aspect (1), the holder can include a contact part configured to make contact with the guard member, and the contact part can be provided with the first suction section and the second suction section.

In this case, since it is possible to limit the flow of the cleaning liquid urged to be leaked to the flow coursed along the opening of the guard member by providing the holder with the contact part making contact with the guard member, it becomes easy to capture the cleaning liquid using the suction by the first suction section and the second suction section. Further, by providing the first suction section and the second suction section to the contact part, it becomes easy to keep the negative pressure in the first suction section and the second suction section, and thus, the suction performance of the cleaning liquid is enhanced. It is possible for the first suction section to suction the attached matter, which is low in viscosity, in the jet plate and the guard member, in advance ahead of the wipe part when performing wiping, and thus prevent the cleaning performance from degrading due to the attached matter dissolved in the cleaning liquid.

Further, since the second suction section suctions the cleaning liquid posterior to the wipe part when performing wiping, it is possible to prevent the cleaning liquid which has a possibility of dropping on the medium from the jet plate and the guard member having been wiped from remaining.

(3) In the cleaning device for the liquid jet head according to the aspect (1) or (2), the holder can include a recessed part configured to form a space with the guard member, and the jet section and the wipe part can be disposed in the recessed part.

In this case, since it is possible to jet the cleaning liquid from a position at a distance from the guard member, it is possible to substantially homogenously spray the cleaning liquid on the guard member. Further, by disposing the jet section and the wipe part in the same recessed part, it is possible to obtain a self-cleaning effect of the wipe part by the cleaning liquid rebounded by the guard member, and thus, it becomes unnecessary to separately dispose a special cleaning space and a cleaning device for the wipe part.

(4) In the cleaning device for the liquid jet head according to the aspect (3), the recessed part can further include a discharge section for the cleaning liquid.

In this case, it is possible to sequentially discharge the cleaning liquid retained in the recessed part, and thus, it is possible to reduce a suction amount of the cleaning liquid necessary to be suctioned from the first suction section and the second suction section. Further, even when the suction amounts of the cleaning liquid from the first suction section and the second suction section are smaller compared to the respective suction amounts when eliminating the discharge section, it is possible to wipe out the cleaning liquid without leaking the cleaning liquid to the outside of the holder. Further, since the first suction section and the second suction section are prevented from being filled with the cleaning liquid by reducing the suction amount of the cleaning liquid from the first suction section and the second suction section in such a manner, it is possible to avoid a rise in internal pressure of the tank for collecting the cleaning liquid. As a result, since it is possible to prevent excessive pressure from being applied to the tank, it is possible to protect the tank.

(5) In the cleaning device for the liquid jet head according to the aspect (3) or (4), the recessed part can be disposed with a width smaller than a width of the guard member in the width direction.

In this case, since the opening of the recessed part is covered with the guard member, it is possible to prevent the cleaning liquid in the recessed part from being leaked through the opening of the recessed part.

(6) In the cleaning device for the liquid jet head according to the aspect any of (1) to (5), the jet section can include a first jet section disposed so as to be opposed to the opening of the guard member.

In this case, since the cleaning liquid can directly be jetted from the first jet section toward the opening of the guard member, it is possible to enhance the cleaning effect of the inside of the opening of the guard member and the jet plate on the periphery of the jet hole.

(7) In the cleaning device for the liquid jet head according to the aspect any of (1) to (6), the jet section can include a second jet section disposed so as to be opposed to a portion of the guard member other than the opening.

In this case, since it is possible to jet the cleaning liquid directly from the second jet section toward the guard member itself, it is possible to clean the surface of the guard member to prevent the ink and so on attached to the guard member from adhering to the medium.

(8) In the cleaning device for the liquid jet head according to the aspect any of (1) to (7), the wipe part can wipe the jet plate while being tilted backward in the moving direction of the holder.

In this case, it is possible to keep an amount of overlap (the contact area) between the wipe part and the jet plate constant by adjusting the direction of the tilt in the wiping operation.

(9) In the cleaning device for the liquid jet head according to the aspect any of (1) to (8), the holder can include a spacer configured to adjust a position in a vertical direction of the wipe part with respect to the jet plate.

In this case, since it is possible to easily adjust the amount of the overlap between the wipe part and the jet plate by replacing the spacer part, it is possible to realize an optimum wipe condition in which a stuck matter such as ink used therein can be separated without breaking the jet plate.

(10) In the cleaning device for the liquid jet head according to the aspect any of (1) to (9), there can further be included a biasing member configured to bias the holder toward the guard member.

In this case, it is possible to control a force for pressing the holder against the guard member. Therefore, it is possible to prevent an excessive force from being applied to the liquid jet head and the peripheral portion of the liquid jet head.

(11) In the cleaning device for the liquid jet head according to the aspect any of (1) to (10), the holder can include a pair of side wall parts disposed at a distance longer than a width of the guard member in the width direction.

In this case, since fitting is failed in some cases due to the manufacturing error when the distance between the pair of side wall parts and the width of the guard member are the same as each other, by making the distance between the pair of side wall parts slightly longer, it is possible to make it easy for the surface of the holder to make contact with the surface of the guard member.

(12) In the cleaning device for the liquid jet head according to the aspect (11), the pair of side wall parts can each include a third jet section configured to jet the cleaning liquid toward a side surface in the width direction of the guard member, and a third suction section disposed so as to surround the third jet section.

In this case, it is possible to clean not only the guard surface covering the jet plate of the guard member, but also the side wall surfaces extending vertically.

According to an aspect of the present disclosure, it is possible to provide a cleaning device for a liquid jet head which can efficiently clean a jet plate attached with a guard member while preventing a cleaning liquid from being leaked along an opening of the guard member.

BRIEF DESCRIPTION OF THE DRAWINGS

FIG. 10 is a perspective view of a holder according to a second modified example of the embodiment.

DETAILED DESCRIPTION OF THE PREFERRED EMBODIMENTS

An embodiment according to the present disclosure will hereinafter be described with reference to the drawings. It should be noted that in the following description, an inkjet head installed in an inkjet printer is illustrated as a liquid jet head.

Figure 1:
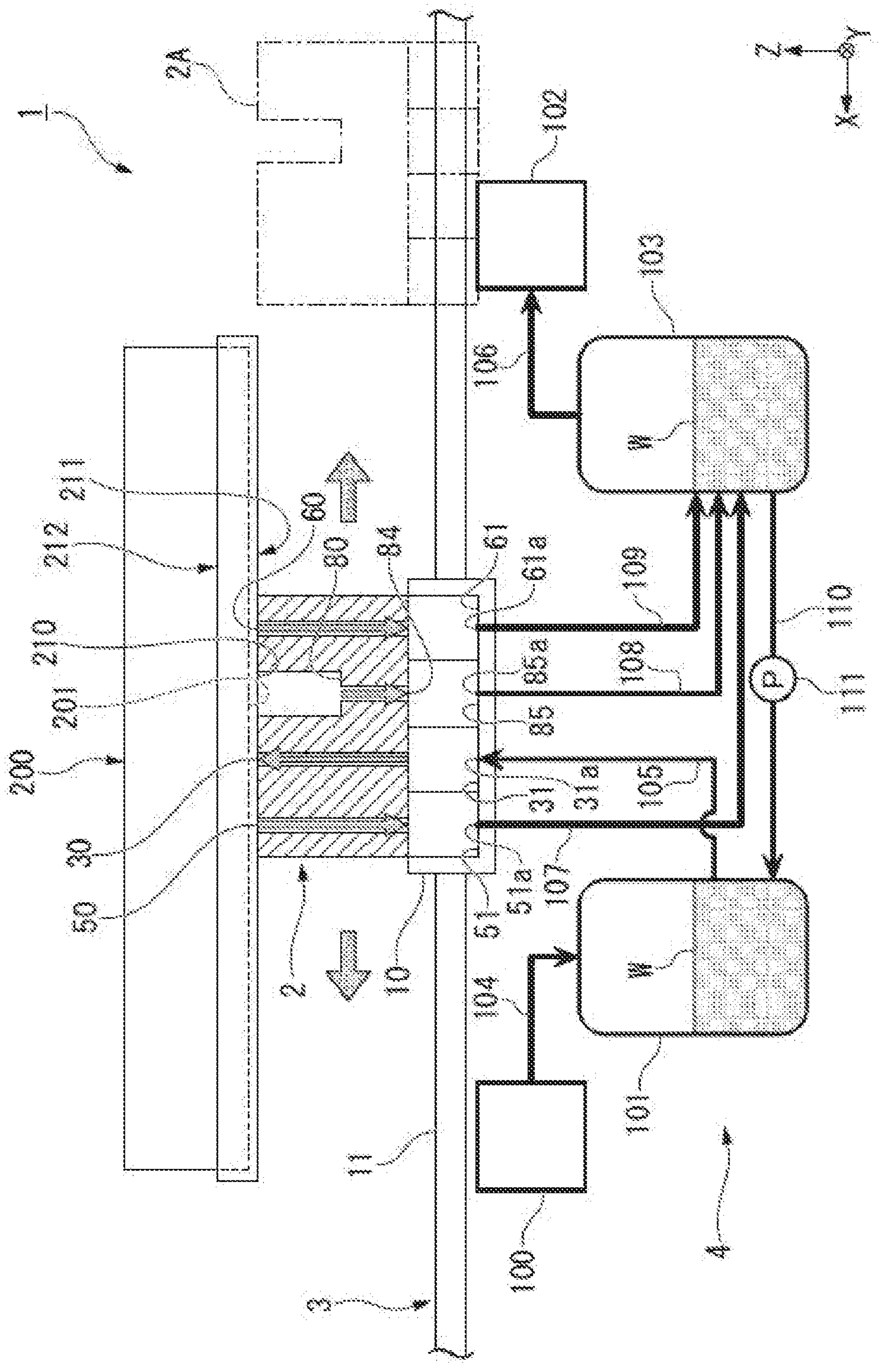
FIG. 1 is a configuration diagram of a cleaning device for an inkjet head according to an embodiment.
Figure 2:
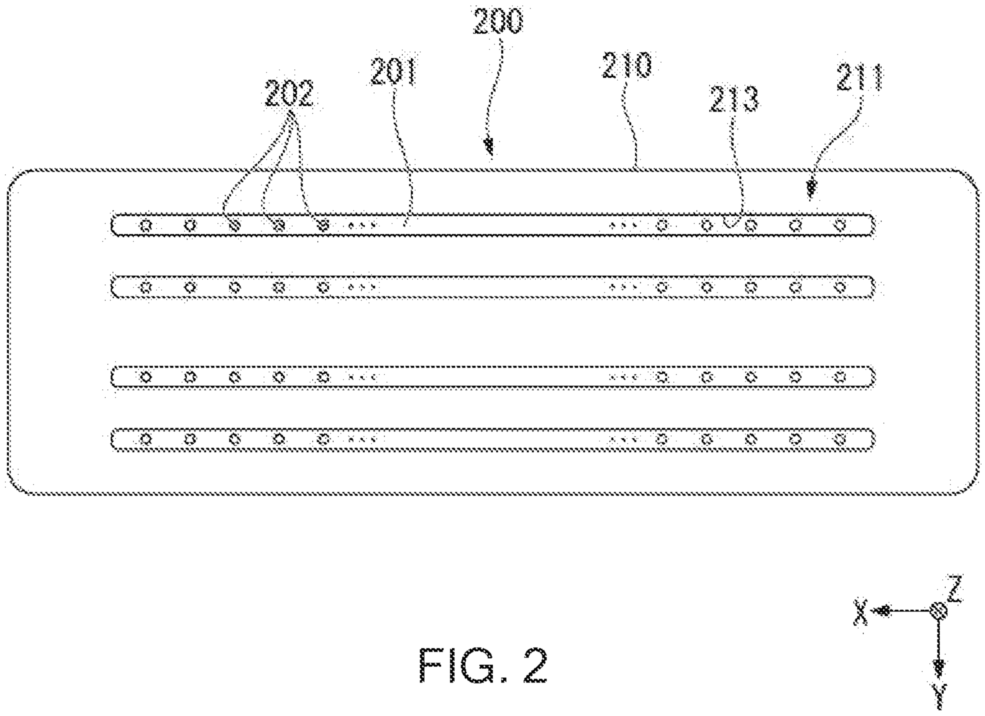
FIG. 2 is a bottom view of the inkjet head according to the embodiment.

FIG. 1 is a configuration diagram of a cleaning device 1 for the inkjet head 200 according to the embodiment. FIG. 2 is a bottom view of the inkjet head 200 according to the embodiment.

As shown in FIG. 2, the inkjet head 200 (the liquid jet head) is provided with a nozzle plate 201 (a jet plate) provided with nozzle holes 202 (jet holes) for ejecting ink (a liquid), and a nozzle guard 210 (a guard member) which covers the nozzle plate 201, and is provided with an opening 213 for exposing the nozzle holes 202.

The nozzle plate 201 is a plate like member bonded to a bottom surface of the inkjet head 200. The nozzle plate 201 is formed of a single layer structure, a laminated structure, or the like made of, for example, a resin material (polyimide or the like), a metal material (SUS or the like), or glass. The nozzle holes 202 are arranged at a predetermined pitch in the nozzle plate 201 to form nozzle arrays.

It should be noted that in the following description, an XYZ Cartesian coordinate system is defined, and positional relationships between the members will be explained with reference to the XYZ Cartesian coordinate system in some cases. An X-axis direction is a direction in which the nozzle arrays described above extend. Further, the X-axis direction is also a moving direction of a holder 2 described later. A Y-axis direction is a direction parallel to a plate surface of the nozzle plate 201 perpendicular to the X-axis direction. Further, the Y-axis direction is also a width direction perpendicular to the moving direction of the holder 2 described later. A Z-axis direction is a direction perpendicular to the nozzle plate 201.

As shown in FIG. 2, the nozzle holes 202 form the four nozzle arrays at intervals in the Y-axis direction. From the nozzle holes 202, there is ejected the ink of four colors such as yellow, magenta, cyan, and black for the respective nozzle arrays. The nozzle plate 201 is bonded to an actuator plate not shown provided with ejection channels and non-ejection channels to form a head chip for ejecting the ink.

In this head chip, in order to eject the ink, a voltage is applied between electrodes provided to the drive walls of the ejection channel to cause the drive wall to make a thickness-shear deformation. Thus, due to a change in volume of the ejection channel, the ink in the ejection channel is ejected through the nozzle hole 202. It should be noted that an ejection method of the liquid is not limited to an electro-mechanical transduction method described above, and it is possible to adopt a charge control method, a pressure vibration method, an electrothermal transduction method, an electrostatic suction method, and so on.

In the charge control method, the material is electrically charged with a charge electrode, and is ejected from a nozzle while controlling a flight direction of the material with a deflection electrode. Further, the pressure vibration method is for applying super high pressure to the material to eject the material toward a nozzle tip, when a control voltage is not applied, the material goes straight to be ejected from the nozzle, and when the control voltage is applied, an electrostatic repelling force is generated between the materials, and the material flies in all directions to be prevented from being ejected from the nozzle.

Further, the electrothermal transduction method is for rapidly vaporizing the material with a heater provided in a space containing the material to generate a bubble, to eject the material in the space with pressure of the bubble. The electrostatic suction method is for applying minute pressure to a space retaining the material to form a meniscus in the nozzle, and then suctioning the material after applying an electrostatic attractive force in this state. Further, besides the above, it is possible to adopt technologies such as a method using a viscosity alteration of a fluid due to an electric field, or a method of flying the material with a discharge spark.

The nozzle guard 210 is formed by applying a press work on a plate member made of, for example, SUS. As shown in FIG. 1, the nozzle guard 210 is formed to have a substantially box like shape opening at a +Z side. The nozzle guard 210 has a guard surface 211 for covering a plate surface (a principal surface) of the nozzle plate 201, and side wall surfaces 212 for covering side surfaces (end surfaces) of the nozzle plate 201 and a part of each of side surfaces of the inkjet head 200.

As shown in FIG. 2, in the guard surface 211 of the nozzle guard 210, a portion opposed to the nozzle holes 202 is provided with openings 213 penetrating the nozzle guard 210 in the Z-axis direction. The openings 213 are each formed to as to be shaped like a slit (an elongated opening) extending in the X-axis direction along the nozzle array formed of the nozzle holes 202. The nozzle holes 202 are exposed outside via the openings 213 of the nozzle guard 210. The nozzle plate 201 is arranged at a position retracted toward the +Z side from the guard surface 211 of the nozzle guard 210.

Going back to FIG. 1, the cleaning device 1 for the inkjet head 200 having the configuration described above is provided with the holder 2, a holder moving device 3 for moving the holder 2, and a cleaning liquid supply device 4 for supplying the holder 2 with the cleaning liquid W. The holder moving device 3 is provided with a carriage 10 loaded with the holder 2, a rail 11 for guiding the carriage 10 in the X-axis direction, and a drive device not shown for moving the carriage 10 along the rail 11. As the drive device, there can be illustrated a drive device having, for example, a belt coupled to the carriage 10, pulleys for circulating the belt, and a motor for rotating the pulleys.

The holder 2 moves in the X-axis direction along the rail 11 from a stand-by position 2A where the holder 2 is not opposed to the inkjet head 200 in the Z-axis direction, and further moves to a position at the opposite side to the stand-by position 2A and where the holder 2 is not opposed to the inkjet head 200 in the Z-axis direction via a position where the holder 2 is opposed to the inkjet head 200. The holder 2 in the present embodiment reciprocates in the X-axis direction along the rail 11. It should be noted that when two rails 11 are arranged in parallel to each other, and the end parts of the respective rails 11 are coupled to each other to form an annular shape, the holder 2 circles the rails having the annular shape to move in only a single direction in some cases.

It should be noted that it is possible to mount the inkjet head 200 on the carriage to move the inkjet head 200 in the X-axis direction instead of the holder 2. In this case, it is sufficient to mount the holder 2 on a holder moving device which does not move in an X-Y plane direction, but moves so as to knock up the holder 2 in the Z-axis direction toward the inkjet head 200 which has moved riding on the carriage when performing wiping. According to this configuration, the wiping operation can be changed between one from a single direction and one in both directions by the timing at which the holder 2 is knocked up in the Z-axis direction.

Figure 3:
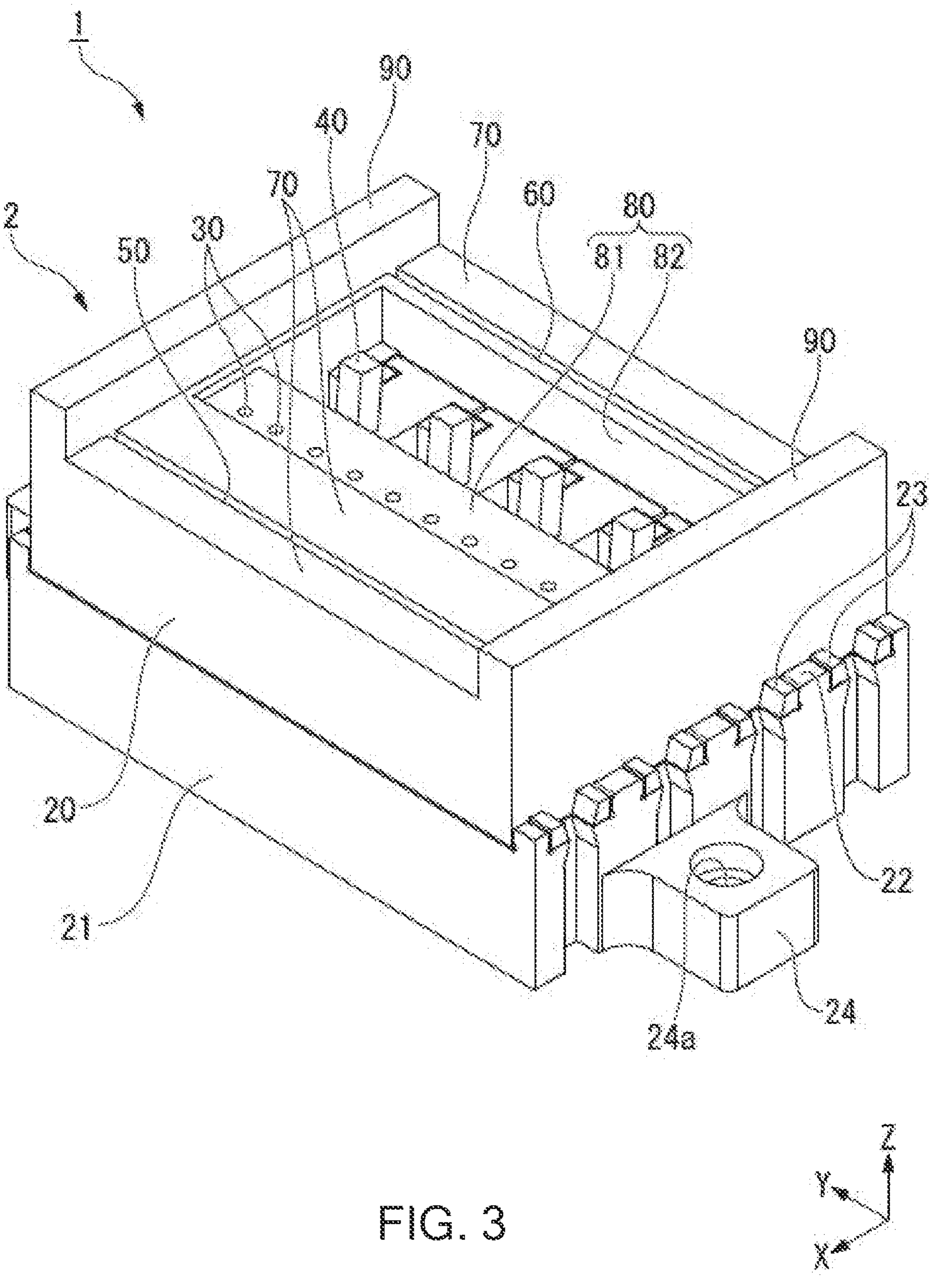
FIG. 3 is a perspective view of a holder according to the embodiment.
Figure 4:
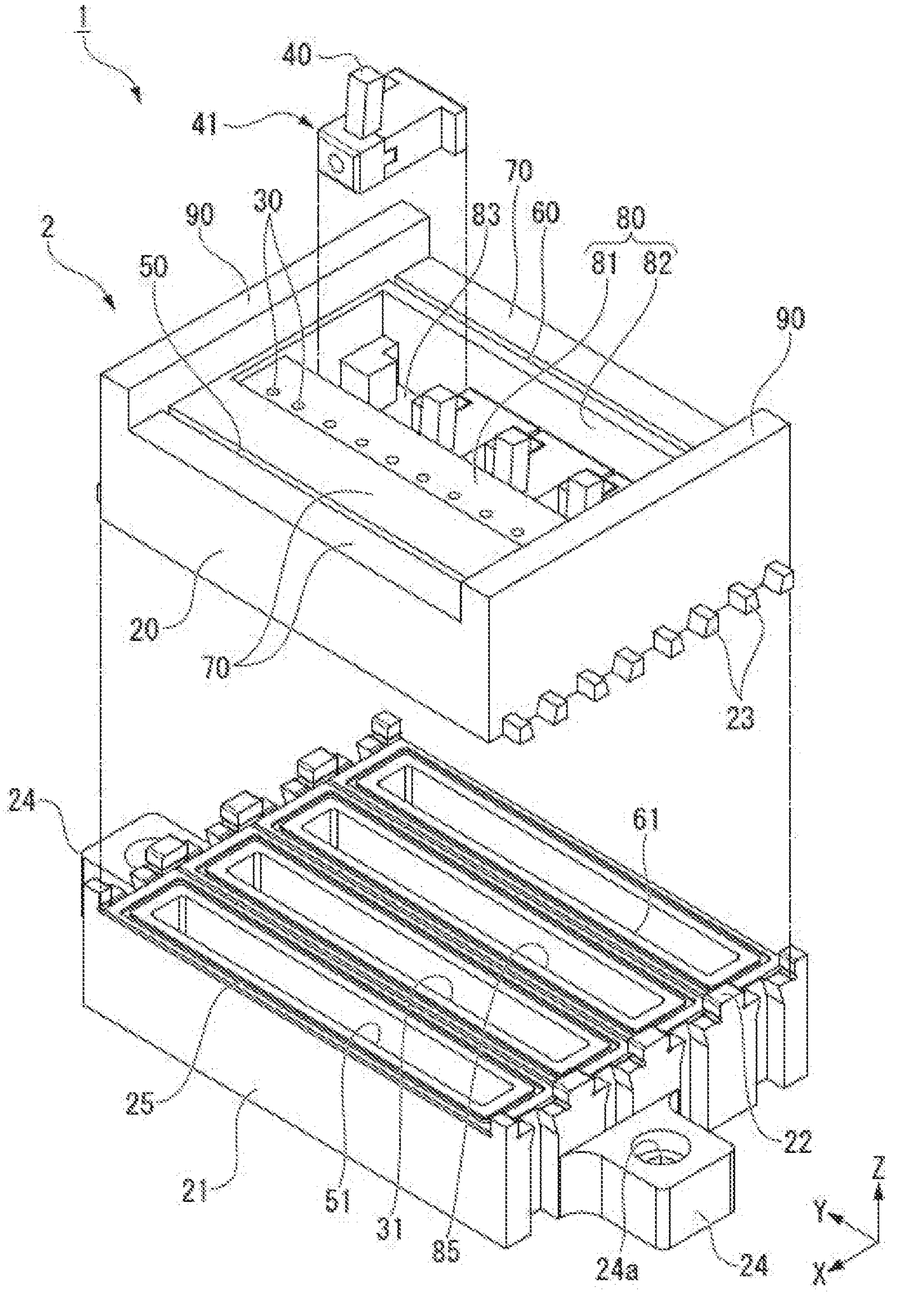
FIG. 4 is an exploded perspective view of the holder according to the embodiment.

FIG. 3 is a perspective view of the holder 2 according to the embodiment. FIG. 4 is an exploded perspective view of the holder 2 according to the embodiment.

As shown in FIG. 3, the holder 2 is formed to have a substantially box like shape provided with an upper case 20 and a bottom case 21. The upper case 20 and the bottom case 21 are each formed of, for example, a resin material.

On the side surfaces at both sides in the Y-axis direction of the upper case 20 and the bottom case 21, there are disposed clamping target parts 22 for combining the both cases, and pairs of clamping parts 23 for clamping the respective clamping target parts 22. The clamping target parts 22 are provided to the bottom case 21, and the pairs of clamping parts 23 are provided to the upper case 20. It should be noted that it is possible for the clamping target parts 22 to be provided to the upper case 20, and for the pairs of clamping parts 23 to be provided to the bottom case 21.

Further, on the side surfaces at the both sides in the Y-axis direction of the bottom case 21, there are disposed fixation sections 24 for fixing the holder 2 to the carriage 10. The fixation sections 24 are each provided with a through hole 24*a* penetrating in the Z-axis direction. The though hole 24*a* is provided with counter boring where a head part of a fixation bolt not shown is disposed. The fixation bolt fixes the bottom case 21 to the carriage 10 via the fixation section 24.

The upper case 20 is provided with jet sections 30, wipe parts 40, a first suction section 50, a second suction section 60, contact parts 70, a recessed part 80, and a pair of side wall parts 90. Meanwhile, as shown in FIG. 4, the bottom case 21 is provided with a jet chamber 31 communicated with the jet sections 30, a first suction chamber 51 communicated with the first suction section 50, a second suction chamber 61 communicated with the second suction section 60, and a discharge chamber 85 communicated with the recessed part 80.

The jet chamber 31, the first suction chamber 51, the second suction chamber 61, and the discharge chamber 85 each have an opening at the +Z side, and the opening is formed to have a rectangular shape extending in the Y-axis direction. In a circumferential edge part of the opening in the first suction chamber 51, there is formed an annular groove part 25. In the annular groove part 25, there is disposed a seal member such as an O-ring not shown. Alternatively, in the annular groove part 25, there is inserted an annular protrusion not shown provided to the upper case 20, and thus, a space between the cases is sealed. It should be noted that the annular groove part 25 is also disposed in the circumferential edge part of the opening of the jet chamber 31, the second suction chamber 61, and the discharge chamber 85 besides the first suction chamber 51.

As shown in FIG. 3, the holder 2 is provided with the contact parts 70 which make contact with the nozzle guard 210, and the recessed part 80 for making a space in the Z-axis direction with respect to the nozzle guard 210. The contact parts 70 are planar parts which make contact with the guard surface 211 of the nozzle guard 210. The contact parts 70 are respectively formed on the periphery of the recessed part 80, at the +X side of the first suction section 50, and at the −X side of the second suction section 60.

The recessed part 80 is provided with a first groove part 81 in which the jet sections 30 are disposed, and a second groove part 82 in which the wipe part 40 is disposed. The second groove part 82 is disposed at the −X side of the first groove part 81, and at the same time, is formed deeper toward the −Z side than the first groove part 81. In other words, the first groove part 81 and the second groove part 82 are formed in a stepwise manner.

From the jet sections 30, there is jetted the cleaning liquid W toward the nozzle guard 210. The jet sections 30 are each a through hole penetrating the upper case 20 in the Z-axis direction in a bottom surface of the first groove part 81. The plurality of jet sections 30 are arranged at intervals in the Y direction. Each of the jet sections 30 is communicated with the jet chamber 31 of the bottom case 21 shown in FIG. 4.

The wipe parts 40 are formed of an elastic material such as rubber. There are disposed four wipe parts 40 at intervals in the Y-axis direction in accordance with the four nozzle arrays. The wipe parts 40 in the present embodiment are each formed to have a prismatic shape, and are each held by a wipe holder 41 as shown in FIG. 4. The wipe holder 41 is formed of, for example, a resin material. The wipe holder 41 is formed to have a T-shape in the plan view, and is fitted into a slot 83 provided to the second groove part 82 of the recessed part 80.

Figure 5:
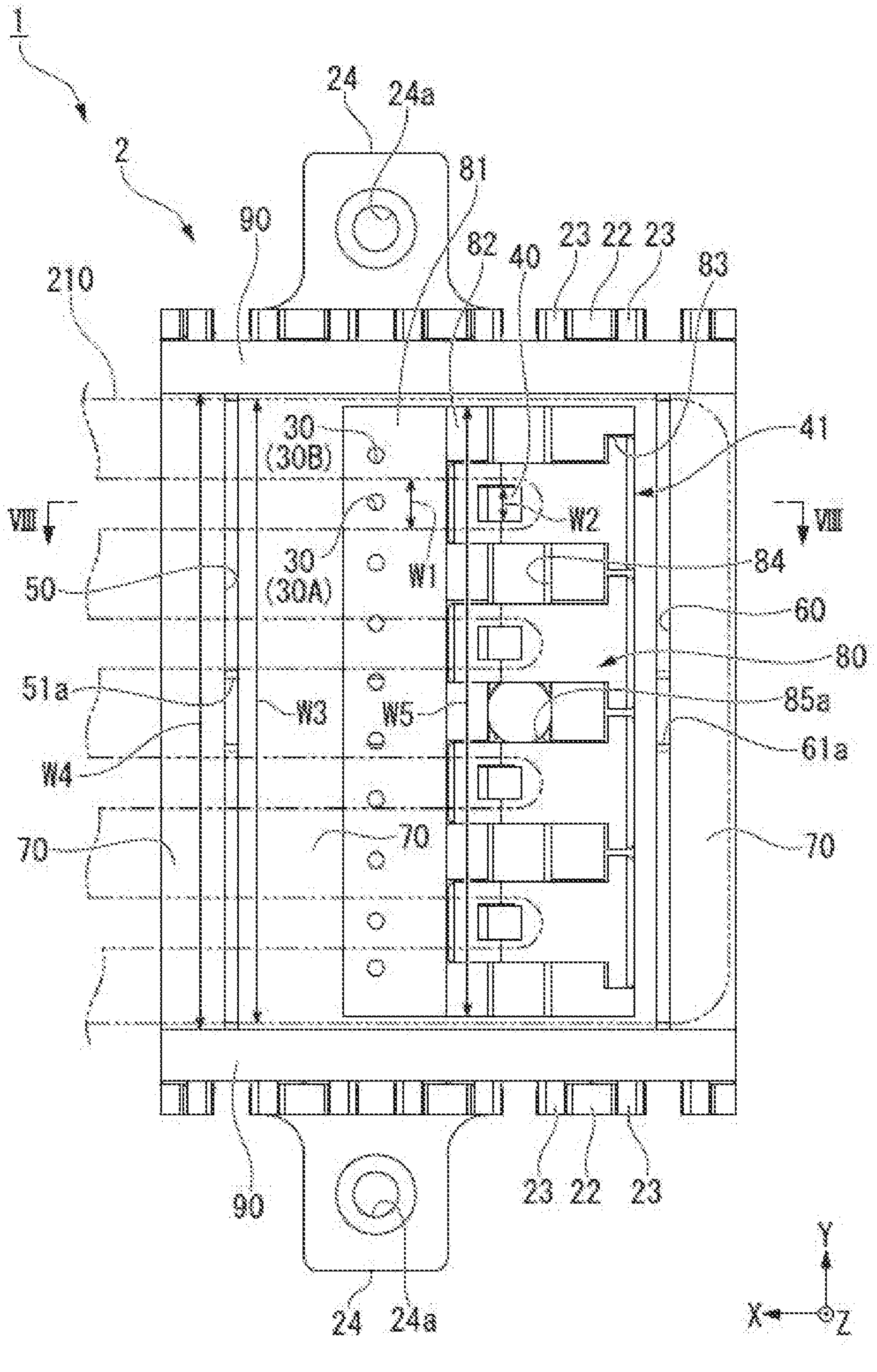
FIG. 5 is a plan view of the holder according to the embodiment.
Figure 6:
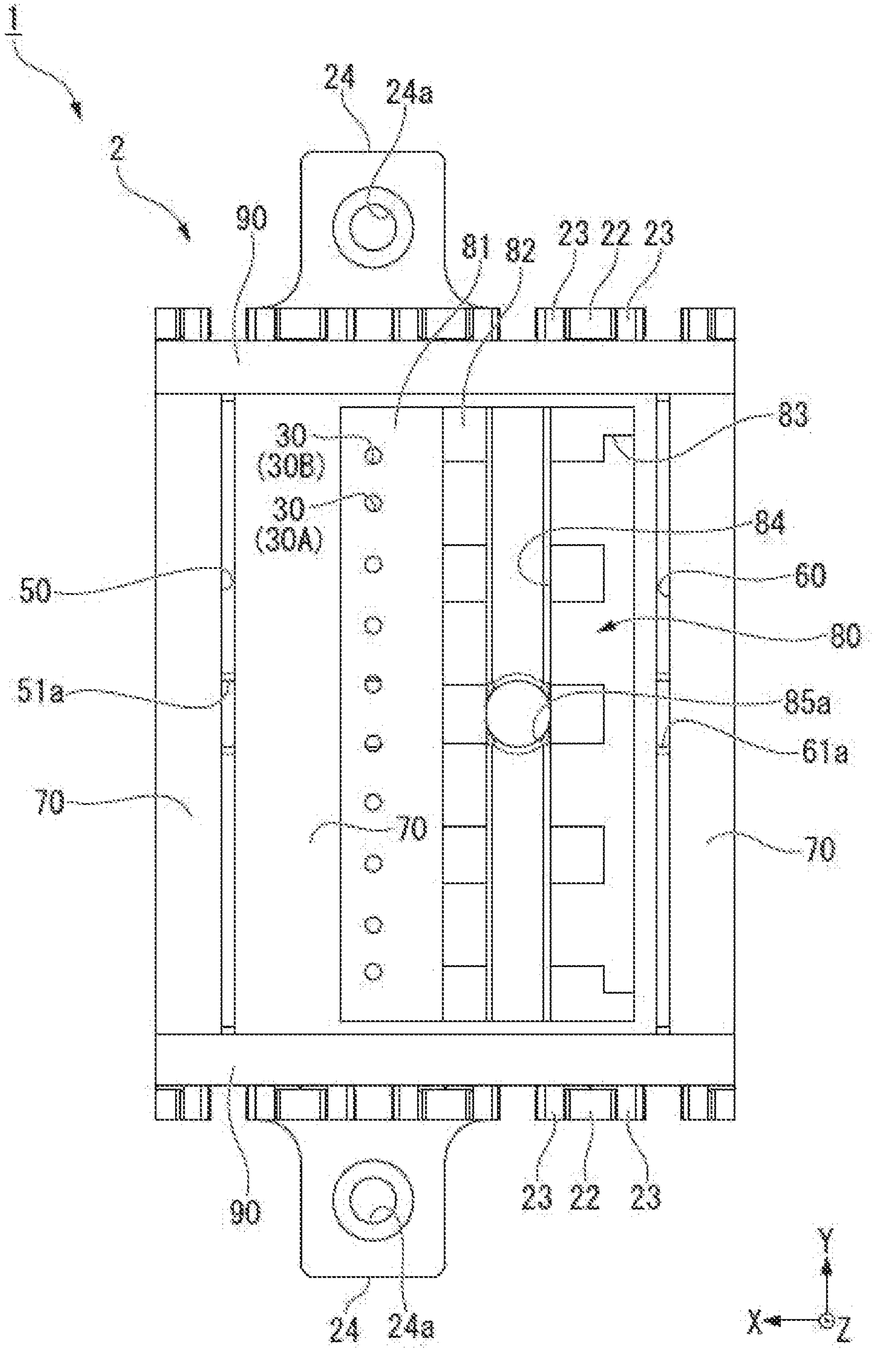
FIG. 6 is a plan view obtained when removing wipe parts and wipe holders from the holder according to the embodiment.
Figure 7:
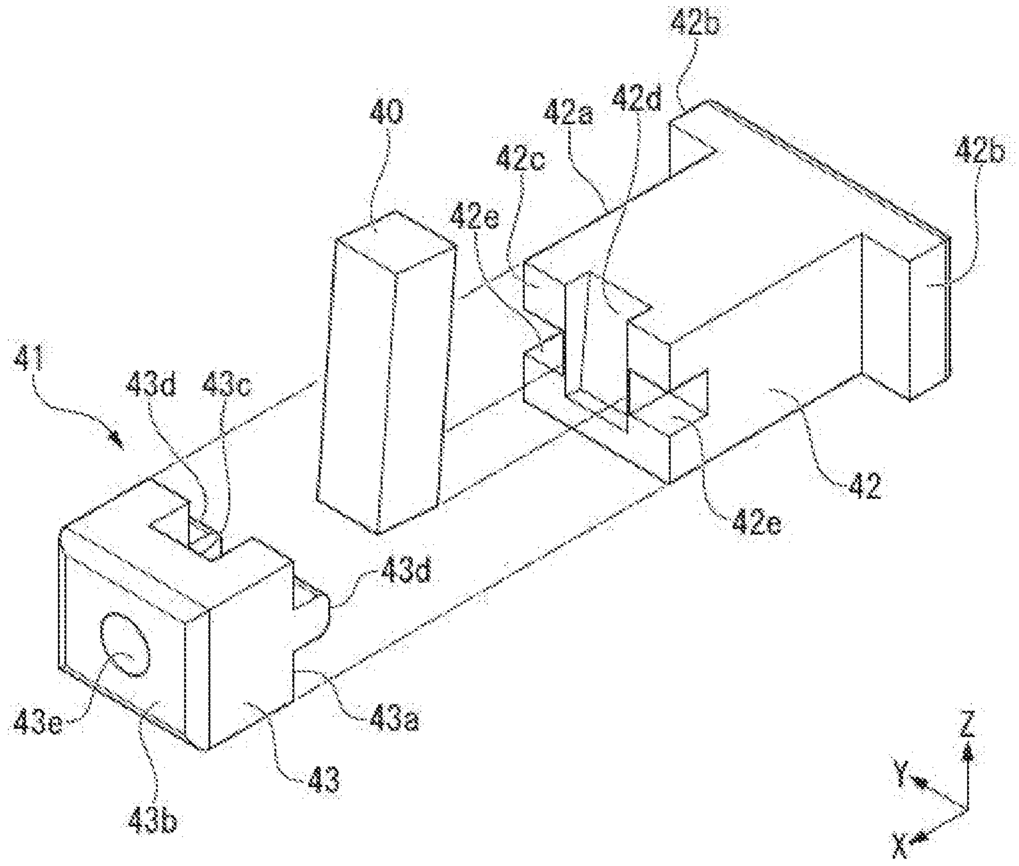
FIG. 7 is an exploded perspective view of the wipe holder according to the embodiment.

FIG. 5 is a plan view of the holder 2 according to the embodiment. FIG. 6 is a plan view obtained when removing the wipe parts 40 and the wipe holders 41 from the holder 2 according to the embodiment. FIG. 7 is an exploded perspective view of the wipe holder 41 according to the embodiment.

As shown in FIG. 5, the jet sections 30 include first jet sections 30A arranged so as to be opposed to the opening 213 of the nozzle guard 210, and second jet sections 30B arranged so as to be opposed to a portion other than the opening 213 of the nozzle guard 210.

The wipe part 40 is made so that a width W2 in the width direction (the Y-axis direction) perpendicular to the moving direction (the X-axis direction) of the holder 2 is smaller than a width W1 of the opening 213 of the nozzle guard 210. In other words, the wipe part 40 is inserted in the opening 213 of the nozzle guard 210, and can make contact with the nozzle plate 201 disposed at the +Z side of the guard surface 211. It should be noted that a gap is formed in the Y-axis direction between the wipe part 40 and the opening 213 of the nozzle guard 210.

As shown in FIG. 6, the bottom surface of the second groove part 82 of the recessed part 80 is provided with a discharge section 84 for the cleaning liquid W. The discharge section 84 is formed to have a slit like shape throughout a space between a pair of inside walls opposed to each other in the Y-axis direction in the recessed part 80. The wipe holder 41 is disposed so as to straddle the discharge section 84 in the X-axis direction. The discharge section 84 is communicated with the discharge chamber 85 of the bottom case 21 shown in FIG. 4. It should be noted that in the plan view shown in FIG. 6, a discharge hole 85*a* of the discharge chamber 85 provided to the bottom case 21 can visually be recognized through the discharge section 84.

As shown in FIG. 5, the recessed part 80 is disposed with a width W5 smaller than a width W3 of the nozzle guard 210 in the width direction. Thus, the opening of the recessed part 80 is covered with the nozzle guard 210 so as to put a lid on the opening. Further, in the circumferential edge part of the opening of the recessed part 80, there is formed the contact part 70 making contact with the nozzle guard 210 to thereby seal the recessed part 80 so that the cleaning liquid W is not leaked from the opening of the recessed part 80.

A pair of side wall parts 90 are erected at both sides in the Y-axis direction of the contact part 70, and are opposed to the side wall surfaces 212 (see FIG. 1) of the nozzle guard 210. The pair of side wall parts 90 are arranged at a distance W4 larger than the width W3 of the nozzle guard 210 in the width direction (the Y-axis direction). Thus, it is possible to avoid a situation that the nozzle guard 210 fails to fit into a space between the pair of side wall parts 90 due to a manufacturing error of the holder 2.

As shown in FIG. 7, the wipe holder 41 is provided with a first clamping segment 42 and a second clamping segment 43 for clamping the wipe part 40. The first clamping segment 42 has a first portion 42*a* extending in the X-axis direction, and second portions 42*b* extending toward the both sides in the Y-axis direction from an end portion at the −X side of the first portion 42*a*. An end surface 42*c* facing to the +X side of the first portion 42*a* is provided with a clamping groove 42*d* for clamping the wipe part 40. The clamping groove 42*d* is tilted toward the −X side with respect to a Y-Z plane.

In the end surface 42*c* of the first portion 42*a*, portions at the both sides in the Y-axis direction of the clamping groove 42*d* are each provided with a fitting groove 42*e*. The second clamping segment 43 has an end surface 43*a* opposed to the end surface 42*c* of the first clamping segment 42. The end surface 43*a* of the second clamping segment 43 is provided with a pair of fitting protrusions 43*d* to be fitted into the fitting grooves 42*e*, respectively. In the end surface 43*a* of the second clamping segment 43, a clamping groove 43*c* opposed to the clamping groove 42*d* of the first clamping segment 42 is formed between the pair of fitting protrusions 43*d*. The clamping groove 43*c* is also tilted toward the −X side with respect to the Y-Z plane similarly to the clamping groove 42*d*.

The second clamping segment 43 is provided with a through window 43*e* penetrating in the X-axis direction from the clamping groove 43*c* to an end surface 43*b* at the opposite side to the first clamping segment 42. By disposing the through window 43*e*, it is possible to check a clamping state of the wipe part 40 in the wipe holder 41, a clamping position in the Z-axis direction of the wipe part 40, and so on. Further, by pouring an adhesive into the through window 43*e*, it is possible to integrally fix the wipe part 40, the first clamping segment 42, and the second clamping segment 43 to each other.

Going back to FIG. 5, the first suction section 50 is disposed at the +X side of the jet sections 30 and the wipe parts 40. The first suction section 50 is a through hole penetrating the upper case 20 in the Z-axis direction in the contact part 70. The first suction section 50 is formed to have a slit like shape in the Y-axis direction throughout the space between the pair of side wall parts 90. The first suction section 50 is communicated with the first suction chamber 51 of the bottom case 21 shown in FIG. 4.

The second suction section 60 is disposed at the −X side of the jet sections 30 and the wipe parts 40. The second suction section 60 is a through hole penetrating the upper case 20 in the Z-axis direction in the contact part 70. The second suction section 60 is formed to have a slit like shape in the Y-axis direction throughout the space between the pair of side wall parts 90. The second suction section 60 is communicated with the second suction chamber 61 of the bottom case 21 shown in FIG. 4.

Going back to FIG. 1, the cleaning liquid supply device 4 is provided with a pressurizing device 100, a cleaning liquid supply tank 101, a depressurizing device 102, and a cleaning liquid collection tank 103. The pressurizing device 100 is coupled to the cleaning liquid supply tank 101 via a first pipe 104. The pressurizing device 100 generates a compressed gas obtained by compressing outside air, and supplies the compressed gas to the cleaning liquid supply tank 101. It should be noted that it is preferable to provide a regulator to the first pipe 104.

The cleaning liquid supply tank 101 retains the cleaning liquid W. As the cleaning liquid W, there can be illustrated water, a solvent which dissolves the fixed ink, and so on. To the cleaning liquid supply tank 101, there is coupled a second pipe 105. The second pipe 105 is coupled to a coupling hole 31*a* provided to the bottom part of the jet chamber 31 of the holder 2. Specifically, when pressurizing the inside of the cleaning liquid supply tank 101 with the pressurizing device 100, the cleaning liquid W in the cleaning liquid supply tank 101 is supplied to the jet chamber 31 via the second pipe 105.

The depressurizing device 102 is coupled to the cleaning liquid collection tank 103 via a third pipe 106. The depressurizing device 102 discharges the air in the cleaning liquid collection tank 103 to the outside. To the cleaning liquid collection tank 103, there are coupled a fourth pipe 107, a fifth pipe 108, a sixth pipe 109, and a seventh pipe 110. The fourth pipe 107 is coupled to a first suction hole 51*a* provided to a bottom part of the first suction chamber 51 of the holder 2.

The fifth pipe 108 is coupled to a discharge hole 85*a* provided to a bottom part of the discharge chamber 85 of the holder 2. The sixth pipe 109 is coupled to a second suction hole 61*a* provided to a bottom part of the second suction chamber 61 of the holder 2. In other words, when depressurizing the inside of the cleaning liquid collection tank 103 with the depressurizing device 102, it is possible to set the inside of the first suction chamber 51, the discharge chamber 85, and the second suction chamber 61 to a negative pressure state, and at the same time, it is possible to collect the cleaning liquid W retained in the chambers in the cleaning liquid collection tank 103 via the fourth pipe 107, the fifth pipe 108, and the sixth pipe 109.

The seventh pipe 110 is coupled to the cleaning liquid supply tank 101. The seventh pipe 110 is provided with a tube pump 111. The tube pump 111 returns the cleaning liquid W collected in the cleaning liquid collection tank 103 to the cleaning liquid supply tank 101. Thus, it is possible to reuse the cleaning liquid W. It should be noted that when the cleaning liquid W thus collected is very dirty, it is not necessary to return the cleaning liquid W to the cleaning liquid supply tank 101.

Figure 8:
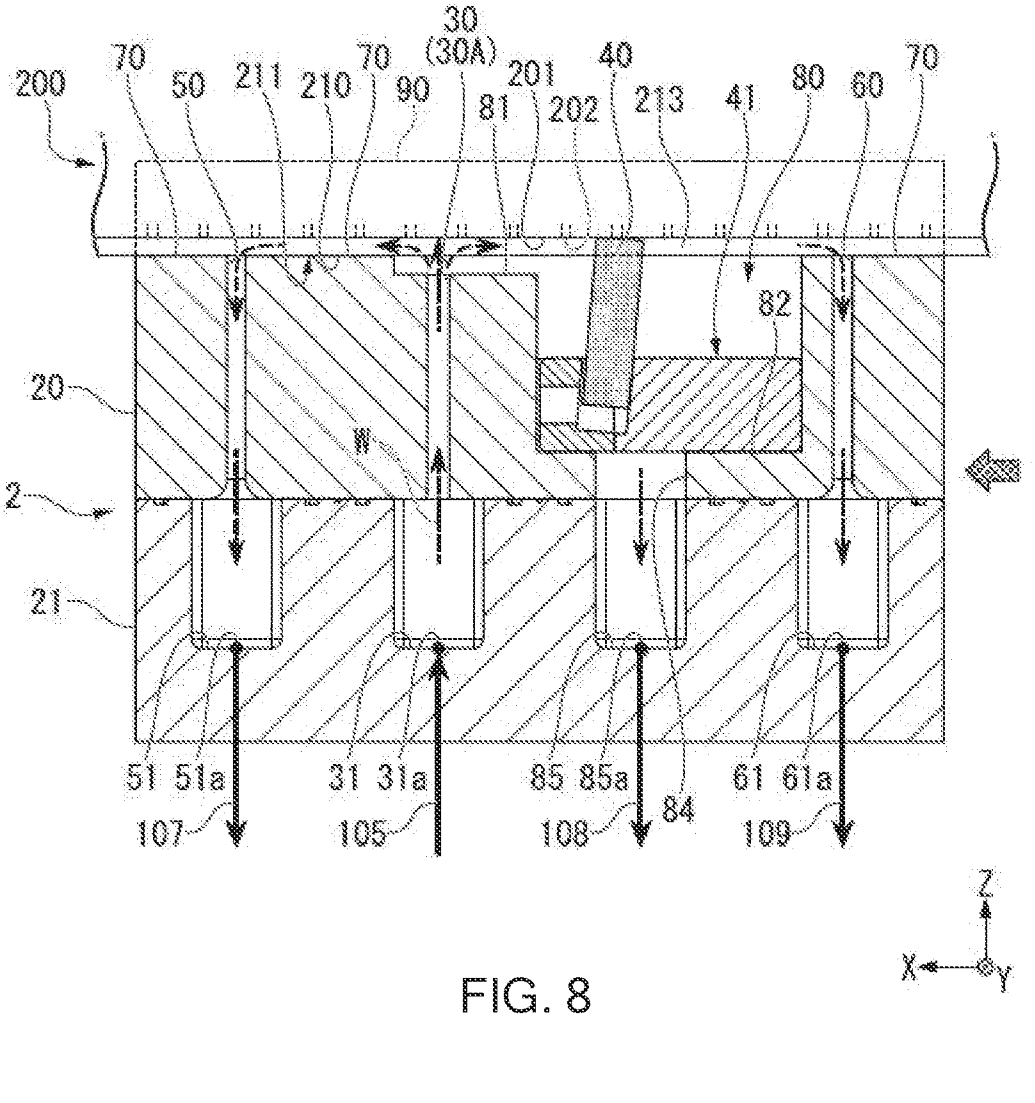
FIG. 8 is a cross-sectional view for explaining flow of a cleaning liquid when wiping a nozzle plate according to the embodiment with the wipe parts.

FIG. 8 is a cross-sectional view for explaining flow of the cleaning liquid W when wiping the nozzle plate 201 according to the embodiment with the wipe parts 40.

As shown in FIG. 8, when wiping the nozzle plate 201 with the wipe parts 40, the cleaning liquid W is jetted from the jet sections 30. The cleaning liquid W jetted from the jet sections 30 (the first jet sections 30A) is supplied to the nozzle plate 201 via the openings 213 of the nozzle guard 210, and flows in the openings 213 of the nozzle guard 210 from the supply positions toward both sides in the X-axis direction.

The cleaning liquid W having flowed toward the +X side in the openings 213 of the nozzle guard 210 is suctioned by the first suction section 50, and is thus collected. Further, the cleaning liquid W having flowed toward the −X side in the openings 213 of the nozzle guard 210 wets the wipe parts 40 to enhance the cleaning performance by the wipe parts 40. Further, the cleaning liquid W supplied to the wipe parts 40 washes out attached matter having adhered to the wipe parts 40, and is then collected from the discharge section 84. Further, the cleaning liquid W having flowed toward the −X side of the wipe parts 40 is suctioned by the second suction section 60, and is thus collected.

As described hereinabove, the cleaning device 1 for the inkjet head 200 according to the present embodiment is provided with the holder 2 which moves relatively to the inkjet head 200 provided with the nozzle plate 201 provided with the nozzle holes 202 for ejecting the ink, and the nozzle guard 210 which covers the nozzle plate 201 and is at the same time provided with the openings 213 for exposing the nozzle holes 202, wherein the holder 2 is provided with the jet sections 30 for jetting the cleaning liquid W toward the nozzle guard 210, the wipe parts 40 each of which has the width W2 in the width direction perpendicular to the moving direction of the holder 2 smaller than the width W1 of the opening 213 of the nozzle guard 210, and which wipe the nozzle plate 201 due to the movement of the holder 2, the first suction section 50 disposed ahead of the jet sections 30 and the wipe parts 40 in the moving direction of the holder 2, and the second suction section 60 disposed posterior to the jet sections 30 and the wipe parts 40 in the moving direction of the holder 2.

According to this configuration, since the wipe part 40 provided to the holder 2 is smaller in the width direction perpendicular to the moving direction of the holder 2 than the width W1 of the opening 213 of the nozzle guard 210, it is possible to wipe the nozzle plate 201 by moving the holder 2 in the state in which the wipe parts 40 are respectively inserted in the openings 213 of the nozzle guard 210. Further, the holder 2 is provided with the jet sections 30 for jetting the cleaning liquid W, and it is possible for the wipe parts 40 to wipe the nozzle plate 201 in the state of being wetted with the cleaning liquid W, and therefore, the cleaning performance by the wipe parts 40 is enhanced. Here, some of the cleaning liquid W is urged to be leaked forward and backward in the moving direction of the holder 2 along the openings 213 of the nozzle guard 210, but the holder 2 is provided with the first suction section 50 and the second suction section 60 across the jet sections 30 and the wipe parts 40, and therefore, it is possible to suction and thus capture the cleaning liquid W which is urged to be leaked forward and backward in the moving direction of the holder 2 to thereby prevent the cleaning liquid W from being leaked from the holder 2.

Further, in the cleaning device 1 for the inkjet head 200 according to the present embodiment, the holder 2 is provided with the contact parts 70 which makes contact with the nozzle guard 210, and the first suction section 50 and the second suction section 60 are disposed between the contact parts 70. According to this configuration, since it is possible to limit the flow of the cleaning liquid urged to be leaked to the flow coursed along the openings 213 of the nozzle guard 210 by providing the holder 2 with the contact parts 70 making contact with the nozzle guard 210, it becomes easy to capture the cleaning liquid using the suction by the first suction section 50 and the second suction section 60. Further, by disposing the first suction section 50 and the second suction section 60 between the contact parts 70, it becomes easy to keep the negative pressure in the first suction section 50 and the second suction section 60, and thus, the suction performance of the cleaning liquid W is enhanced. It is possible for the first suction section 50 to suction the attached matter, which is low in viscosity, in the nozzle plate 201 and the nozzle guard 210, in advance ahead of the wipe parts 40 when performing wiping, and thus prevent the cleaning performance from degrading due to the attached matter dissolved in the cleaning liquid W. Further, since the second suction section 60 suctions the cleaning liquid W posterior to the wipe parts 40 when performing wiping, it is possible to prevent the cleaning liquid W which has a possibility of dropping on the medium from the nozzle plate 201 and the nozzle guard 210 having been wiped from remaining.

Further, in the cleaning device 1 for the inkjet head 200 according to the present embodiment, the holder 2 is provided with the recessed part 80 which forms the space with the nozzle guard 210, and the jet sections 30 and the wipe parts 40 are disposed in the recessed part 80. According to this configuration, since it is possible to jet the cleaning liquid W from a position at a distance from the nozzle guard 210, it is possible to substantially homogenously spray the cleaning liquid W on the nozzle guard 210. Further, by disposing the jet sections 30 and the wipe parts 40 in the same recessed part 80, it is possible to obtain a self-cleaning effect of the wipe parts 40 by the cleaning liquid W rebounded by the nozzle guard 210, and thus, it becomes unnecessary to separately dispose a special cleaning space and a cleaning device for the wipe parts 40.

Further, in the cleaning device 1 for the inkjet head 200 according to the present embodiment, the recessed part 80 is further provided with the discharge section 84 for the cleaning liquid W. According to this configuration, it is possible to sequentially discharge the cleaning liquid W retained in the recessed part 80, and thus, it is possible to reduce a suction amount of the cleaning liquid W necessary to be suctioned from the first suction section 50 and the second suction section 60. Further, even when the suction amounts of the cleaning liquid from the first suction section 50 and the second suction section 60 are smaller compared to the respective suction amounts when eliminating the discharge section 84, it is possible to wipe out the cleaning liquid without leaking the cleaning liquid to the outside of the holder 2. Further, since the first suction section 50 and the second suction section 60 are prevented from being filled with the cleaning liquid by reducing the suction amount of the cleaning liquid from the first suction section 50 and the second suction section 60 in such a manner, it is possible to avoid a rise in internal pressure of the cleaning liquid collection tank 103 (see FIG. 1) for collecting the cleaning liquid. As a result, since it is possible to prevent excessive pressure from being applied to the cleaning liquid collection tank 103, it is possible to protect the cleaning liquid collection tank 103.

It should be noted that when the jet amount of the cleaning liquid is smaller compared to the discharge amount of the discharge section 84 when applying no negative pressure, the discharge can sufficiently be performed without applying the negative pressure to the discharge section 84, and therefore, it is possible for a weak suction pump to ensure the sufficient negative pressure in the first suction section 50 and the second suction section 60 to prevent the cleaning liquid from being leaked outside the holder 2.

Further, in the cleaning device 1 for the inkjet head 200 according to the present embodiment, the recessed part 80 is disposed with the width W5 smaller than the width W3 of the nozzle guard 210 in the width direction. According to this configuration, since the opening of the recessed part 80 is covered with the nozzle guard 210, it is possible to prevent the cleaning liquid W in the recessed part 80 from being leaked through the opening of the recessed part 80.

Further, in the cleaning device 1 for the inkjet head 200 according to the present embodiment, the jet sections 30 include the first jet sections 30A disposed so as to be opposed to the openings 213 of the nozzle guard 210. According to this configuration, since it is possible to directly jet the cleaning liquid W from the first jet sections 30A toward the openings 213 of the nozzle guard 210, it is possible to enhance the cleaning effect of the inside of the openings 213 of the nozzle guard 210 and the nozzle plate 201 on the periphery of the nozzle holes 202.

Further, in the cleaning device 1 for the inkjet head 200 according to the present embodiment, the jet sections 30 include the second jet sections 30B disposed so as to be opposed to portions other than the openings 213 of the nozzle guard 210. According to this configuration, since it is possible to jet the cleaning liquid W directly from the second jet sections 30B toward the nozzle guard 210 itself, it is possible to clean the surface of the nozzle guard 210 to prevent the ink and so on attached to the nozzle guard 210 from adhering to the medium.

Further, in the cleaning device 1 for the inkjet head 200 according to the present embodiment, the wipe parts 40 wipe the nozzle plate 201 while being tilted backward in the moving direction of the holder 2. According to this configuration, it is possible to keep an amount of overlap (the contact area) between the wipe part 40 and the nozzle plate 201 constant by adjusting the direction of the tilt in the wiping operation.

Further, in the cleaning device 1 for the inkjet head 200 according to the present embodiment, the holder 2 is provided with the pair of side wall parts 90 arranged at the distance W4 longer than the width W3 of the nozzle guard 210 in the width direction. According to this configuration, since fitting is failed in some cases due to the manufacturing error when the distance W4 between the pair of side wall parts 90 and the width W3 of the nozzle guard 210 are the same as each other, by making the distance between the pair of side wall parts 90 slightly longer, it is possible to make it easy for the surface of the holder 2 to make contact with the surface of the nozzle guard 210.

As described above, according to the present embodiment, it is possible to provide the cleaning device 1 for the inkjet head 200 which can efficiently clean the nozzle plate 201 attached with the nozzle guard 210 while preventing the cleaning liquid W from being leaked along the openings 213 of the nozzle guard 210.

Further, it is possible for the cleaning device 1 for the inkjet head 200 to adopt the following configurations.

Figure 9:
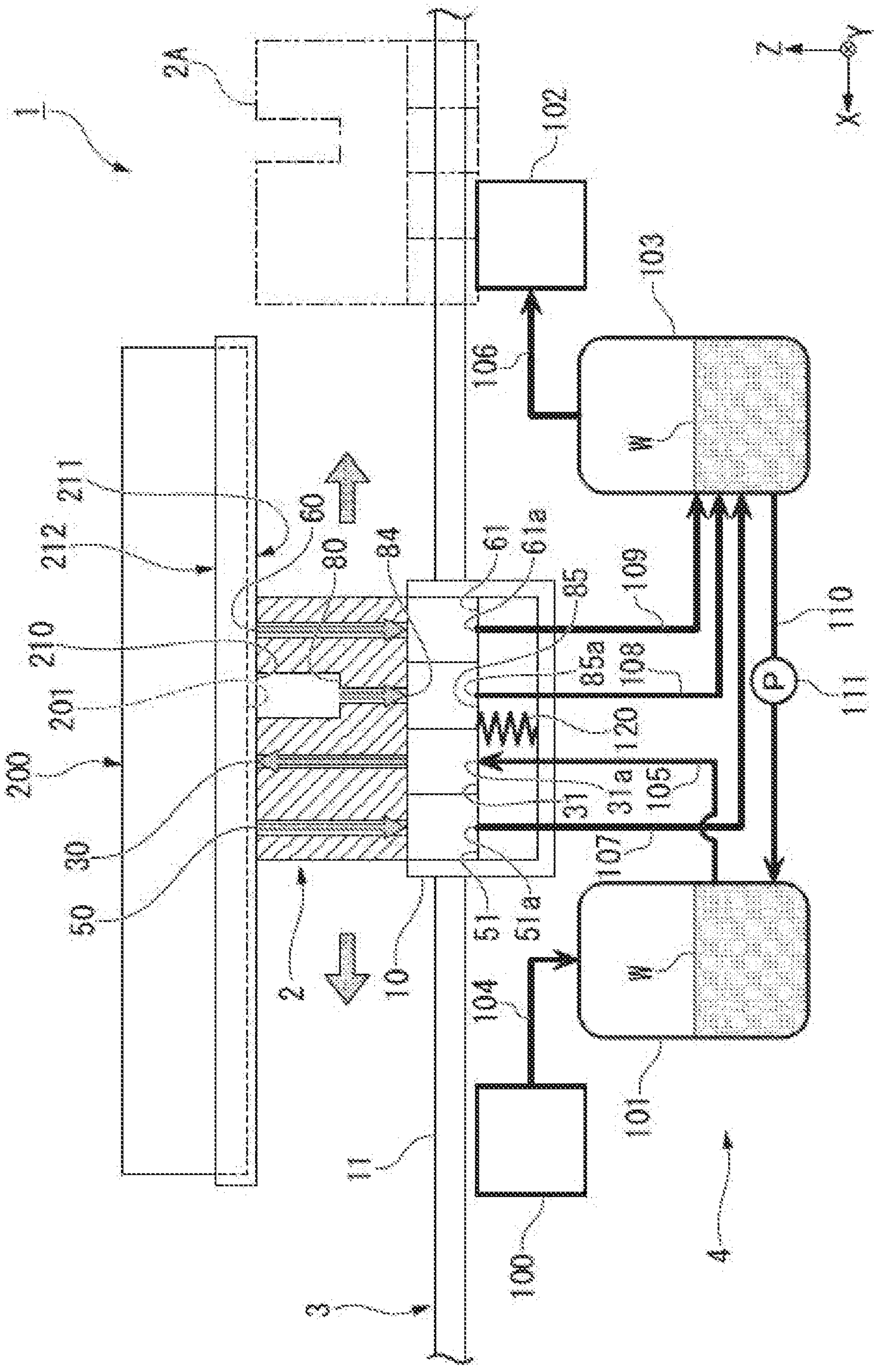
FIG. 9 is a configuration diagram of a cleaning device for an inkjet head according to a first modified example of the embodiment.

FIG. 9 is a configuration diagram of the cleaning device 1 for the inkjet head 200 according to a first modified example of the embodiment.

The cleaning device 1 shown in FIG. 9 is provided with a biasing member 120 for biasing the holder 2 toward the nozzle guard 210. The biasing member 120 is, for example, a spring or rubber, and is disposed between the holder 2 and the carriage 10. According to this configuration, it is possible to control a force for pressing the holder 2 against the nozzle guard 210. Therefore, it is possible to prevent an excessive force from being applied to the inkjet head 200 and the peripheral portion of the inkjet head 200.

FIG. 10 is a perspective view of the holder 2 according to a second modified example of the embodiment.

In the holder 2 shown in FIG. 10, the pair of side wall parts 90 are each provided with a third jet section 130 for jetting the cleaning liquid W to the side surface in the width direction of the nozzle guard 210, and a third suction section 140 disposed so as to surround the third jet section 130. The third jet section 130 and the third suction section 140 are provided to each of the opposed surfaces opposed to each other of the pair of side wall parts 90. The third jet sections 130 are formed at the same position as those of the jet sections 30 in the X-axis direction, and are communicated with the jet chamber 31 of the bottom case 21 similarly to the jet sections 30 as shown in FIG. 4.

The third suction sections 140 are each provided with a horizontal slit part 141 extending in the X-axis direction passing at the +Z side of the third jet section 130, a first vertical slit part 142 connecting an end portion at the +X side of the horizontal slit part 141 and the first suction section 50 to each other, and a second vertical slit part 143 connecting an end portion at the −X side of the horizontal slit part 141 and the second suction section 60 to each other. Specifically, the third suction section 140 is connected to the first suction section 50 and the second suction section 60 to generate the negative pressure. According to this configuration, it is possible to clean not only the guard surface 211 covering the nozzle plate 201 of the nozzle guard 210, but also the side wall surfaces 212 extending vertically.

Figure 11:
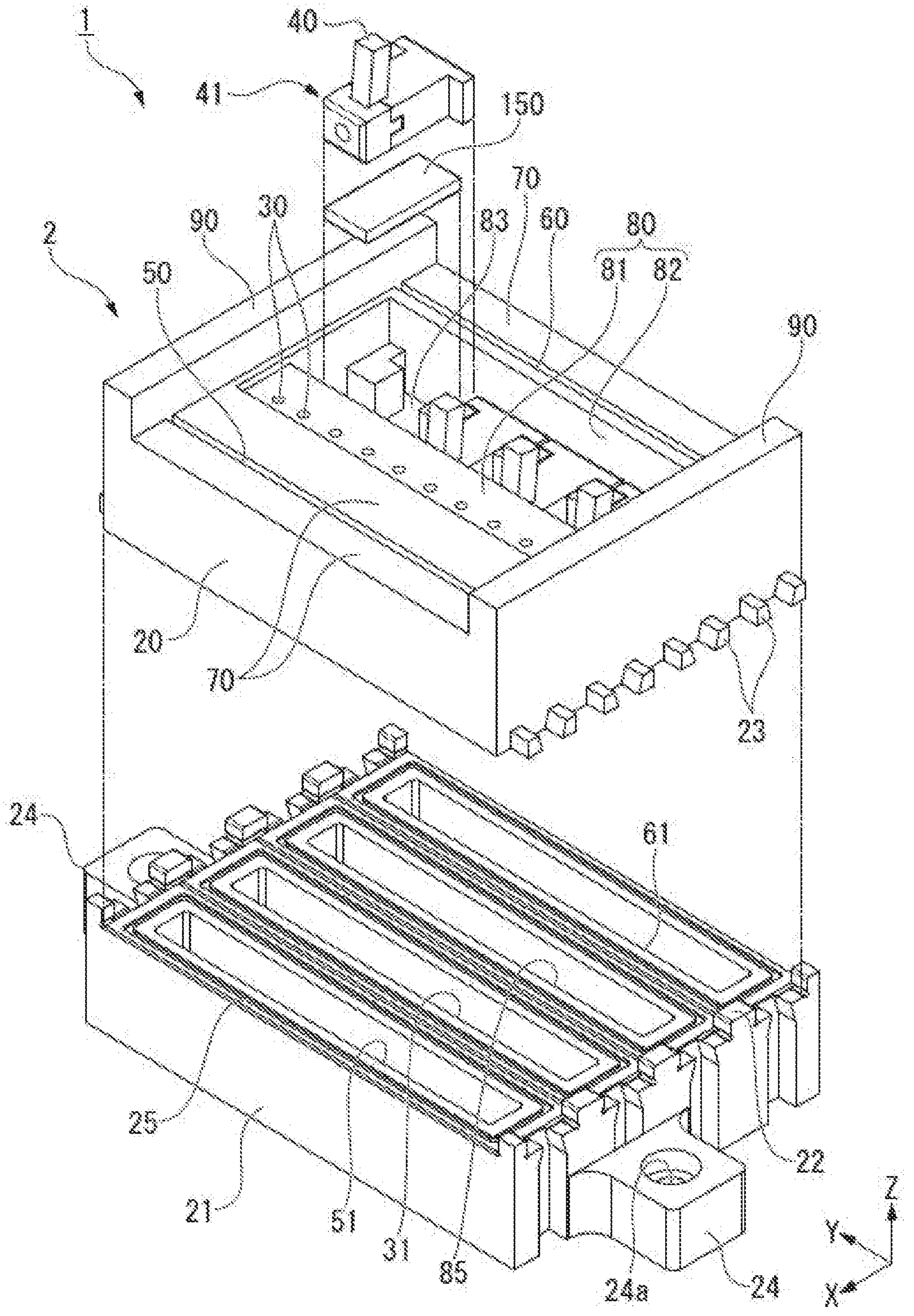
FIG. 11 is an exploded perspective view of a holder according to a third modified example of the embodiment.

FIG. 11 is an exploded perspective view of the holder 2 according to a third modified example of the embodiment.

The holder 2 shown in FIG. 11 is provided with spacer parts 150 for adjusting positions in the vertical direction (the Z-axis direction) of the wipe parts 40 with respect to the nozzle plate 201. The spacer parts 150 are each housed in the slot 83 together with the wipe holder 41. According to this configuration, since it is possible to easily adjust the amount of the overlap between the wipe parts 40 and the nozzle plate 201 by replacing the spacer part 150, it is possible to realize an optimum wipe condition in which a stuck matter such as ink used therein can be separated without breaking the nozzle plate 201.

Although the preferred embodiments of the present disclosure are hereinabove described, it should be understood that these are illustrative descriptions of the present disclosure, and should not be considered as limitations. Modification such as addition, omission, and displacement can be implemented within the scope or the spirit of the present disclosure. Therefore, the present disclosure should not be assumed to be limited by the above descriptions, but is limited by the appended claims.

For example, although in the embodiments described above, there is described the configuration in which the wipe parts are tilted in advance backward in the moving direction of the holder, it is possible to adopt a configuration in which the wipe parts are disposed vertically in the Z-axis direction in an initial state, and are then tilted backward in the moving direction of the holder when making contact with the nozzle plate 201 or the nozzle guard 210. In this case, when the holder reciprocates, substantially the same cleaning effect can be obtained between a forward path and a backward path.

Further, for example, in the embodiments described above, the description is presented citing the inkjet head as an example of the liquid jet head, but this is not a limitation.

Further, as the inkjet head, it is possible to adopt a configuration (a so-called shuttle machine) in which the inkjet head moves with respect to the recording target medium when performing printing, or to adopt a configuration (a so-called fixed-head machine) in which the recording target medium is moved with respect to the inkjet head in the state in which the inkjet head is fixed.

In the embodiments described above, there is described when the recording target medium is paper, but this configuration is not a limitation. The recording target medium is not limited to paper, but can also be a metal material or a resin material, and can also be food or the like. Further, the liquid to be jetted from the liquid jet head is not limited to what is landed on the recording target medium, but can also be, for example, a medical solution to be blended during a dispensing process, a food additive such as seasoning or a spice to be added to food, or fragrance to be sprayed in the air.

In the embodiments described above, there is described the configuration in which the Z-axis direction coincides with the gravitational direction, but this configuration is not a limitation, and it is also possible for the Z-axis direction to be set along the horizontal direction, or to be set along any other directions than the gravitational direction.

What is claimed is:

1. A cleaning device for a liquid jet head comprising a holder moving relatively to the liquid jet head including a jet plate provided with a jet hole configured to jet liquid, and a guard member which covers the jet plate and is provided with an opening configured to expose the jet hole, wherein the holder includes a jet section configured to jet cleaning liquid toward the guard member, a wipe part which has a width in a width direction perpendicular to a moving direction of the holder smaller than a width of the opening of the guard member, and which wipes the jet plate due to a movement of the holder, a first suction section disposed ahead of the jet section and the wipe part in the moving direction of the holder, and a second suction section disposed posterior to the jet section and the wipe part in the moving direction of the holder.

2. The cleaning device for the liquid jet head according to claim 1, wherein the holder includes a contact part configured to make contact with the guard member, and the contact part is provided with the first suction section and the second suction section.

3. The cleaning device for the liquid jet head according to claim 1, wherein the holder includes a recessed part configured to form a space with the guard member, and the jet section and the wipe part are disposed in the recessed part.

4. The cleaning device for the liquid jet head according to claim 3, wherein the recessed part further includes a discharge section for the cleaning liquid.

5. The cleaning device for the liquid jet head according to of claim 3, wherein the recessed part is disposed with a width smaller than a width of the guard member in the width direction.

6. The cleaning device for the liquid jet head according to claim 1, wherein the jet section includes a first jet section disposed so as to be opposed to the opening of the guard member.

7. The cleaning device for the liquid jet head according to claim 1, wherein the jet section includes a second jet section disposed so as to be opposed to a portion of the guard member other than the opening.

8. The cleaning device for the liquid jet head according to claim 1, wherein the wipe part wipes the jet plate while being tilted backward in the moving direction of the holder.

9. The cleaning device for the liquid jet head according to claim 1, wherein the holder includes a spacer configured to adjust a position in a vertical direction of the wipe part with respect to the jet plate.

10. The cleaning device for the liquid jet head according to claim 1, further comprising a biasing member configured to bias the holder toward the guard member.

11. The cleaning device for the liquid jet head according to claim 1, wherein the holder includes a pair of side wall parts disposed at a distance longer than a width of the guard member in the width direction.

12. The cleaning device for the liquid jet head according to claim 11, wherein the pair of side wall parts each include a third jet section configured to jet the cleaning liquid toward a side surface in the width direction of the guard member, and a third suction section disposed so as to surround the third jet section.

* * * * *